United States Patent [19]

Duffin

[11] Patent Number: 5,991,723
[45] Date of Patent: Nov. 23, 1999

[54] METHOD AND APPARATUS FOR TRANSLATING TEXT AND SPEECH TRANSFERRED OVER A TELEPHONY OR SIMILAR NETWORK

[75] Inventor: Paul Andrew Duffin, Waterlooville, United Kingdom

[73] Assignee: International Business Machines Corporation, Armonk, N.Y.

[21] Appl. No.: 09/103,691

[22] Filed: Jun. 24, 1998

[30] Foreign Application Priority Data

Jan. 17, 1998 [EP] European Pat. Off. ............... 9800896

[51] Int. Cl.[6] .............................. H04M 11/00; G10L 9/00
[52] U.S. Cl. .................. 704/260; 704/270; 704/27 S; 379/52
[58] Field of Search ................................ 704/260, 270, 704/27 S; 379/52

[56] References Cited

U.S. PATENT DOCUMENTS 5,163,081  11/1992  Wycherley et al. .................. 379/52
5,253,285  10/1993  Alheim ................................ 379/52
5,724,405   3/1998  Engelke et al. ..................... 379/52
5,809,112   9/1998  Ryan ................................... 379/52
5,815,196   9/1998  Alshawi .............................. 348/17

Primary Examiner—David R. Hudspeth
Assistant Examiner—Susan Wieland
Attorney, Agent, or Firm—John D. Flynn

[57] ABSTRACT

A computer telephone relay service for interfacing between a textphone and a telephone. A textphone call is made to the computer which makes a further call to a telephone or vice versa. The computer then translates the messages between the text-phone and telephone using voice recognition and text-to-speech hardware.

18 Claims, 2 Drawing Sheets

METHOD AND APPARATUS FOR TRANSLATING TEXT AND SPEECH TRANSFERRED OVER A TELEPHONY OR SIMILAR NETWORK

FIELD OF INVENTION

This invention relates to text and speech translation and in particular relates to text and speech translation for text phones used in a telephony or similar network.

BACKGROUND OF INVENTION

A profoundly deaf, hard of hearing or speech impaired person can communicate using a text phone (also referred to as a "textphone") to another text phone user over a regular telephony connection. The user of a first text phone makes a telephone call by dialling the telephone number of a second text phone to establish a telephony connection. When the second user answers the telephone call the first user sends a greeting over the connection by using his text phone to play an audio data signal over the connection. The audio data signal follows a standard audio data protocol (eg v21, v22 bis, v23) which is understandable by the second user's text phone. On receiving the greeting the second user's text phone will send a audio response to acknowledge the connection. After this handshaking the users can have a conversation using text messages entered on the keyboards which their respective text phones convert into audio signals. These audio signals are sent over the connection in a similar fashion to voice conversations.

A problem exists when a text phone user wishes to communicate with someone who does not have access to a text phone. This finds one solution in a relay service such as the National Telephony Relay Service in the UK and equivalent services in the rest of the world. Such services are funded at least in part by the national telecommunication companies and comprise a call center of operators having access to text phone or computer emulation of a text phone and conferencing or multi-line telephony facilities. A text phone user will dial into the service over a first telephony connection and make a request using a text message to the operator who has or is emulating a similar machine to the user. The request will contain the telephone number of a party the user wishes to communicate with. The operator dials this number on a regular telephone based system and opens a second telephony connection when the party answers. The operator may briefly explain that he is a Relay operator acting on behalf of the text phone user. The operator then acts as an intermediary as he receives text messages from the user over the first connection and reads them to the party on the second connection. Conversely the party replies verbally to the operator over the second connection and the operator types text messages and sends them to the user over the first connection.

This solution does have several disadvantages. Chiefly it relies on a limited number of operators to handle the calls and supply is fixed in the short term so that it may be under-utilised in one period and saturated in another such that expensive resources are not used efficiently. Furthermore since this service is a human translation service the costs are relatively high and when, as is usual the service is subsidised, the total number of operators is constrained to below the actual demand. Also such a solution lacks absolute privacy and users may be discouraged in its use for sensitive or business matters.

BRIEF DESCRIPTION OF DRAWINGS

In order to promote a fuller understanding of this and other aspects of the present invention, an embodiment will now be described, by way of example only, with reference to the accompanying drawings in which.

DETAILED DESCRIPTION OF PREFERRED EMBODIMENT

Figure 1:
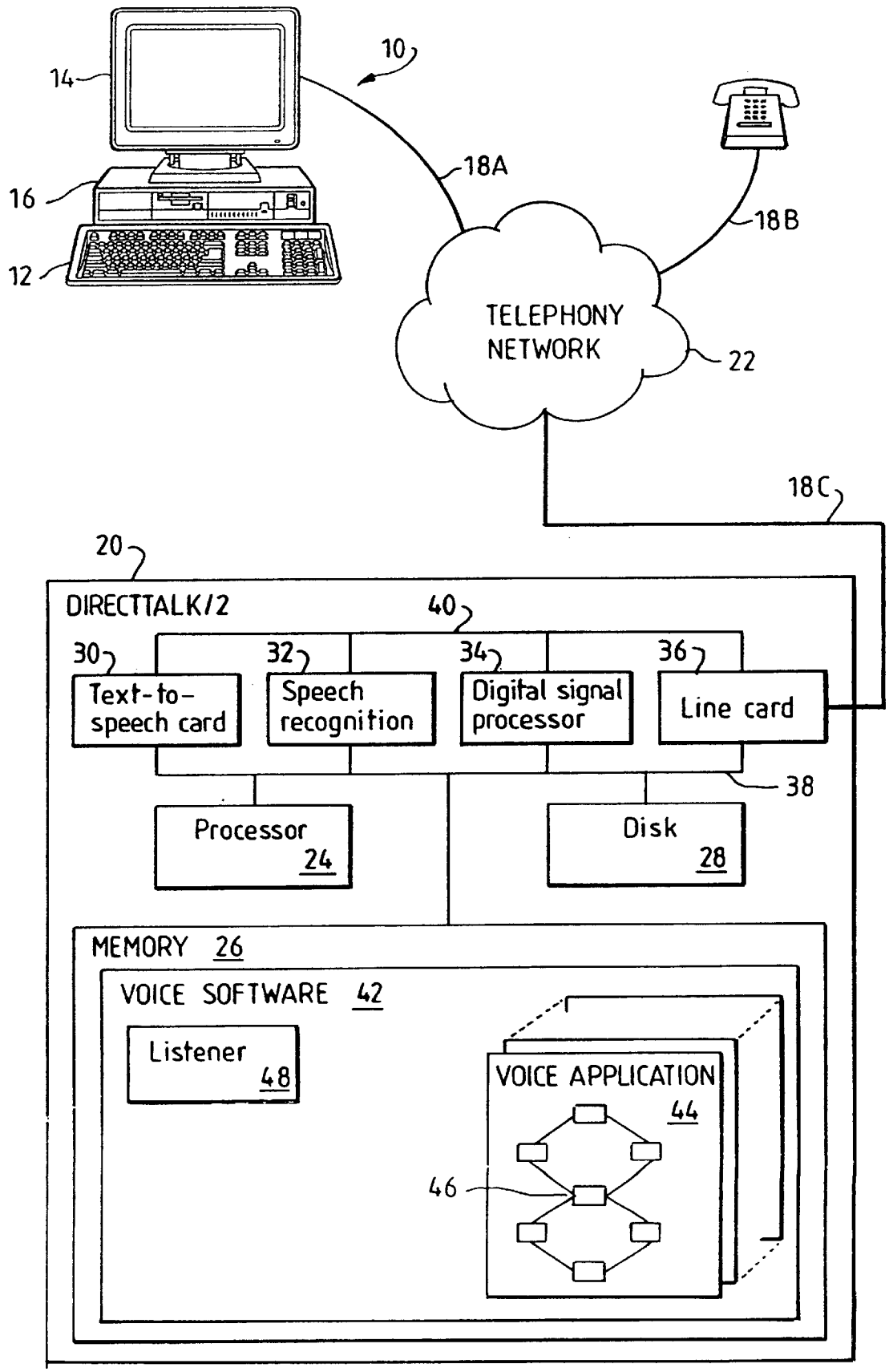
FIG. 1 is a schematic representation of a first embodiment of the system.

A typical text phone 10 comprises a keyboard 12, display 14 and processor 16 which connect into a standard telephone line 18. In a regular method of operation of a text phone, a text phone user dials the telephone number of a another text phone user. On answering the first user sends a text message in modem protocol from his text phone over the connection to the second user's text phone which receives the message and converts it back into text for display to the user.

In accordance with an embodiment of the invention the text phone may call a non-text phone user without a human translator. Such an embodiment uses a computer server 20 suitable for connecting to a telephony network 22. Such a server 20 could be an IBM DirectTalk/2 system comprising an IBM Pentium based PC, OS/2 operating system and DirectTalk/2 voice processing software 42. The IBM PC comprises pentium processor 24, memory 26, hard disk 28, text to speech card 30, speech recognition card 32, voice card 34 and a line card 36 all connected to a main computer bus 38. The text-to-speech card 30, speech recognition card 32, voice card 34 and line card 36 are also connected to a dedicated time dimensioned multiplex bus (TDM) 40 to enable fast real time processing of voice data independently of the main processor bus 38.

The embodiment has separate cards for the text-to-speech, speech recognition, line and voice functions but it should be clear to a person skilled in the art that a single card with appropriate software could be used.

The line card 36 sits inside the PC and is the interface between the T1 (in the US) or E1 (in Europe) trunk telephone lines from the telephony network 22 (perhaps via a private branch exchange) and the computer bus 38 or TDM bus 40. The line card 36 converts the trunk line protocol into a protocol compatible for the computer bus 38 and the TDM bus 40 and performs line operations such as answering and making calls on the telephone line 18C.

The speech recognition card 32 comprises a Voice (DSP) expansion board compatible with a TDM bus having speech recognition software. The speech recognition software features continuous and discrete speaker independent recognition and can support up to 8 lines of discrete recognition or 2 lines of continuous recognition on each Texas Instruments TM320C31 DSP. Antares is a trademark of Dialogic.

The text-to-speech card 30 comprises a DSP expansion board compatible with a TDM bus and associated software to convert any computer-readable text into intelligible, synthetic speech. In this example the card converts the input text into a phonetic transcript, the speech parameters are calculated and used to generate synthetic voice signals.

The voice card 34 comprises a DSP expansion board compatible with a TDM bus and associated software for processing of the signal on an incoming phone line. In this embodiment the voice card converts text from the speech recognisor card into a text phone protocol signal and a text phone protocol signal into text for the text-to-speech card.

The voice processing software 42 controls each of the hardware cards. The exact sequence of controlling events is determined by an application 44 running on the voice processing software 42. The application 44 comprises a sequence of instructions 46 which are performed by the voice processing software 42. For instance when a call is incoming on a line the voice processing software 42 opens an instance of an application 44 associated with that line and executes a first instruction to answer the call using the line card and place the incoming signal on a channel of the TDM bus 40. The next instruction maybe to instruct the voice card to analyse the incoming signal on that channel. For each incoming call a new instance of the application is opened and executed. A routine in the software which looks for events such as call coming in or connect hang up is called a listener. On such an event the listener routine will make certain calls to initiate other routines.

Figure 2:
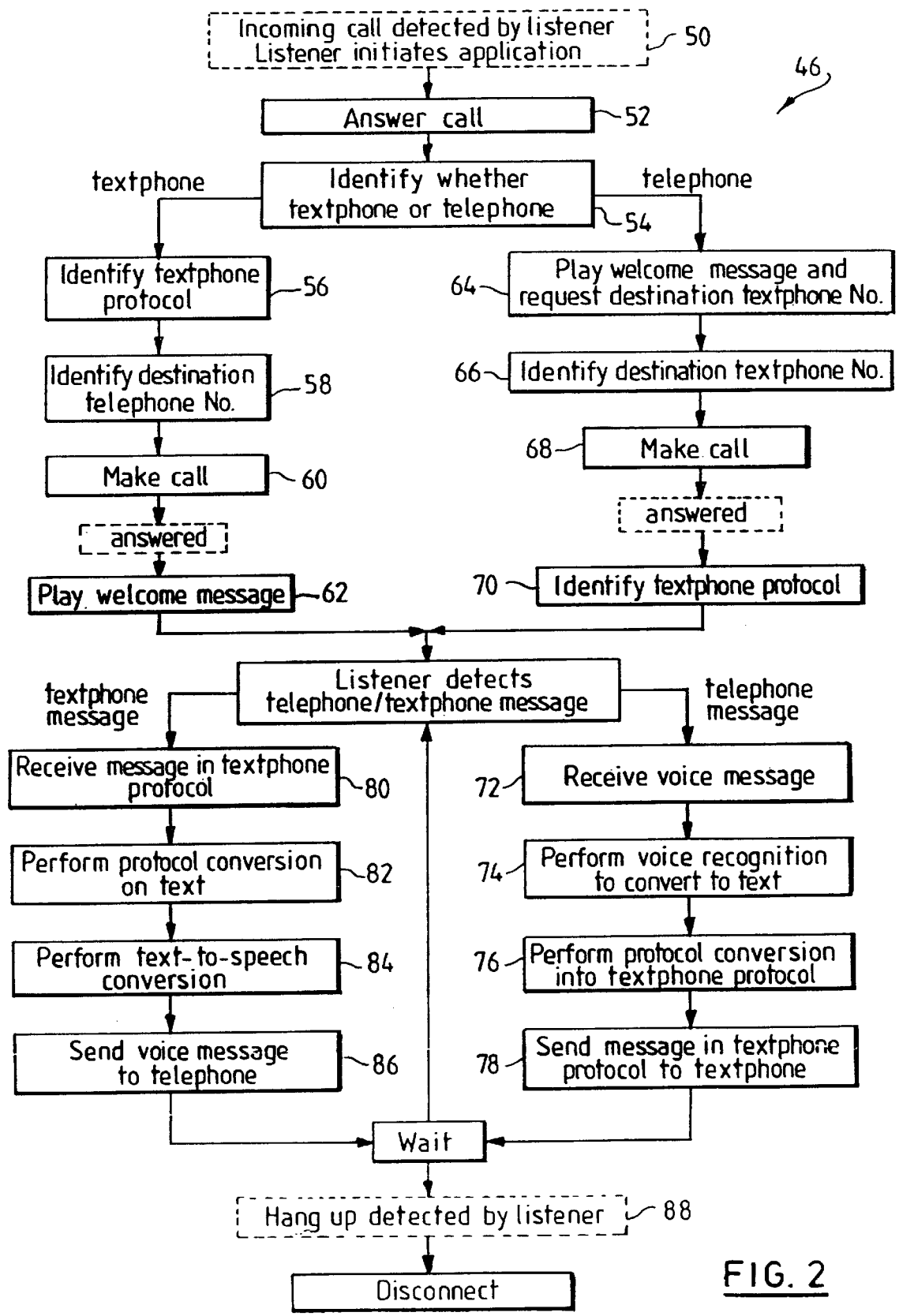
FIG. 2 is a flow diagram of the process steps in the present embodiment.

The operation of the embodiment is shown in FIG. 2 by boxes representing typical instructions forming an application. A text phone user wishing to make a call to a non-text phone user initially makes a call to a DT/2 system number associated with textphone to telephone conversion. A telephone user wishing to make a call to a textphone user makes a call to another DT/2 system number associated with telephone to textphone conversion. However, suitable programmed, the system could recognise whether a textphone or telephone initiated the call and proceed accordingly.

The line card 36 in the DT/2 system detects incoming call on a first line. An incoming call listener 48 running in the voice software checking for incoming calls initiates 50 an instance of an application in the voice processing software. The application instructs 52 the line card to answer the call, allocates a channel on the TDM bus for the signal and instructs the voice card to process the signal. The voice card detects 54 whether the caller is a telephone or a text phone.

If the caller is a text phone the voice card then computes 56 the relevant protocol used by the textphone and passes this back to the application. The signal can comprise the destination phone number and the voice card computes 58 this. Alternatively the system sends a request to the text phone for the destination telephone number along with a textphone welcome message. Once acquired the application passes the destination telephone number to a routine for instructing the line adapter to make a call 60 on a second line to the destination telephone number. When the call is answered a welcome message is played 62 over the second line explaining to the caller that the textphone caller is using a computer as an intermediary between the caller and asking the caller to speak with appropriate speed and clarity.

If the initial caller is a telephone then a welcome message is played along with a request for a destination number 64. The caller may speak the number and have it recognized 66 by the speech recognizer card and then confirmed or may enter it using his telephone keypad and have the voice card recognize the tones. Either way once the destination telephone number is confirmed the application passes the destination telephone number to a routine for instructing the line adapter to make a call 68 on a second line to the textphone having the destination number supplied. When the call is answered the application identifies the textphone protocol 70 and sends a welcome message to the textphone in that protocol.

When the telephone user talks into his phone the message is taken 72 from the telephone line and routed on to a TDM channel. The speech recognisor card takes the message and converts 74 it into text. The message in text is passed to the voice card to convert 76 it into the text phone protocol. The message is now in the correct form to be passed out 78 on the textphone line by the line adapter to the textphone user.

When the textphone user sends 80 a message in the text phone protocol on textphone line to the server the message is picked up by the line adapter and converted 82 from the protocol to text code. The message in text code is sent to the text-to-speech card either over the PCI bus or the TDM bus for conversion 84 to speech. The message in speech is then output 86 on the telephone line to the telephone user on line 2.

The process repeats for each message. The voice processing software packages the speech signal and the textphone signal into discrete data messages, this has the advantage that the resources are only being used during the processing of the messages and therefore increases the capacity of the system.

However it is possible to dedicate single channels on the resources and deal with the textphone input as a continuous stream and similarly to deal with the speech input as a continuous stream. This simplifies the software design. Using either method full duplex message exchange, both textphone and telephone, is achieved.

Another listener 88 detects when either of the parties hang up and informs the application. The application then disconnects that line and a message played to other party (in speech or textphone protocol as appropriate) to explain that disconnection has occurred. The application then disconnects the remaining line. Alternatively the voice software may ask the user if he would like to make another call.

Such a system may also be used as an interface between textphones having different protocols.

In an extension of the system, language conversion software is installed on the server to operate on the text and convert it from one language (English say) to another (French say) and back. The text-to-speech card is adapted to perform the language of the text (in this case French) and the listener will hear a french voice speaking the translation of an english text entered by an english speaking test phone users. The speech recognition is adapted for french speech and the language conversion software working in reverse to produce english text from the french speech.

The IBM DirectTalk/2 PC based system is only one example of the type of server that could be used to perform the invention. An IBM DirectTalk/6000 system using an RS/6000 based server and Digital Trunk Processing unit would be suitable and preferred if handling large numbers of calls.

In summary there is described a computer telephone relay service for interfacing between a textphone and a telephone. A textphone call is made to the computer which makes a further call to a telephone or vice versa. The computer then translates the messages between the text-phone and telephone using voice recognition and text-to-speech hardware.

The invention has been described by way of a preferred embodiment, various modifications and improvements will occur to those person skilled in the art. Therefore it should be understood that the preferred embodiment has been provided as an example and not as a limitation.

In particular, it should be realised that telephony network is intended to cover analogue and digital telephone networks and also telephony over the internet. Also the term 'telephony connection' covers both circuit and packet switching.

I claim:

1. A system for interfacing between a textphone and a telephone via a telephone network comprising:

means for receiving a call from a textphone or a telephone on a first network connection;

means for acquiring a destination telephone or textphone number respectively from the user of the telephone or textphone;

means for making a call on a second network connection to the destination telephone or textphone number;

means for receiving a textphone signal from the textphone in a first language;

a first translator for translating said textphone signal from said first language into a second language;

means for converting the translated textphone signal from a textphone protocol to a speech signal;

means for transmitting the speech signal to the telephone in said second language;

means for receiving a speech signal from the telephone in said second language;

means for converting the speech signal into a textphone signal in the desired protocol;

a second translator for translating said textphone signal from said second language into said first language; and means for transmitting the translated textphone signal to the textphone in said first language.

2. A system as claimed in claim 1 further comprising means for identifying the textphone protocol used.

3. A system as claimed in claim 2 wherein the means for converting a text signal to a speech signal comprises a digital signal processor and appropriate software.

4. A system as claimed in claim 3 wherein the line card, text-to-speech card and speech recognizer means are connected to a computer bus and the hardware functions are controlled by voice software running on a computer.

5. A system as claimed in claim 4 wherein the dedicated bus is a time division multiplex bus.

6. A system as claimed in claim 1 wherein the means for receiving calls, means for receiving signals, the means for making calls and the means for transmitting messages are hardware functions on a telephone network line card which is connected to a telepony trunk line.

7. A system as claimed in claim 6 wherein the means for converting the speech signal into a text signal comprises a digital signal processor and appropriate software.

8. A system as claimed in claim 7 wherein the line card, text-to-speech card and speech recognizer means are further connected by a dedicated data bus independent of the computer bus.

9. A system as claimed in claim 1 further comprising means for packaging the speech signals and textphone signals into discrete data messages.

10. A system as claimed in claim 9 further comprising means for detecting discontinuities in the speech or textphone signal which may act as markers for the data messages.

11. A method of interfacing between a textphone and a telephone via a telephone network comprising the steps of:

receiving a call from a textphone or a telephone on a first network connection;

acquiring a destination telephone or textphone number respectively from the user of the telephone or textphone;

making a call on a second network connection to the destination telephone or textphone number;

receiving a textphone signal from the textphone in a first language;

translating said textphone signal from said first language into a second language;

converting the translated textphone signal from a textphone protocol to a speech signal;

transmitting the speech signal to the telephone in said second language;

receiving a speech signal from the telephone in said second language;

converting the speech signal into a textphone signal in the desired protocol;

translating said textphone signal from said second language into said first language; and transmitting the translated textphone signal to a textphone in said first language.

12. The method as set forth in claim 11 further comprising the step of identifying the textphone protocol used.

13. The method as set forth in claim 12 further comprising the step of packaging the speech signals and textphone signals into discrete date messages.

14. The method as set forth in claim 12 further comprising the step of:

detecting discontinuities in the speech or textphone signal which may act as markers for the date messages.

15. The method as set forth in claim 14 further comprising the step of packaging the speech signals and textphone signals into discrete data messages.

16. The method as set forth in claim 11 further comprising the step of packaging the speech signals and textphone signals into discrete date messages.

17. The method as set forth in claim 16 further comprising the step of:

detecting discontinuities in the speech or textphone signal which may act as markers for the data messages.

18. The method as set forth in claim 11 further comprising the step of:

detecting discontinuities in the speech or textphone signal which may act as markers for the data messages.

* * * * *